United States Patent
Liu et al.

(10) Patent No.: US 9,660,735 B1
(45) Date of Patent: May 23, 2017

(54) SYSTEMS AND METHODS FOR MITIGATING INTERFERENCE AT AN ACCESS NODE

(71) Applicant: Sprint Spectrum LP, Overland Park, KS (US)

(72) Inventors: Chunmei Liu, Great Falls, VA (US); Pratik Kothari, Herndon, VA (US); Krishna Sitaram, Chantilly, VA (US); Hemanth Pawar, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 63 days.

(21) Appl. No.: 14/856,960

(22) Filed: Sep. 17, 2015

(51) Int. Cl.
| | |
|---|---|
| *H04W 72/04* | (2009.01) |
| *H04B 1/10* | (2006.01) |
| *H04B 15/00* | (2006.01) |
| *H04L 12/26* | (2006.01) |
| *H04W 36/20* | (2009.01) |

(52) U.S. Cl.
CPC ......... *H04B 15/00* (2013.01); *H04L 43/0823* (2013.01); *H04L 43/16* (2013.01); *H04W 72/0433* (2013.01); *H04W 36/20* (2013.01)

(58) Field of Classification Search
CPC .......... H04B 1/10; H04B 1/406; H04B 15/00; H04L 43/16; H04L 43/0823; H04W 72/04; H04W 72/0433; H04W 36/20
USPC .................................................. 370/329, 252
See application file for complete search history.

(56) References Cited

U.S. PATENT DOCUMENTS

| | | | | |
|---|---|---|---|---|
| 2009/0059851 | A1* | 3/2009 | Weil | H04W 16/10 370/329 |
| 2010/0135235 | A1* | 6/2010 | Ji | H04W 72/082 370/329 |
| 2013/0039195 | A1* | 2/2013 | Weng | H04W 48/20 370/252 |
| 2013/0344801 | A1* | 12/2013 | Redana | H04W 72/082 455/9 |
| 2014/0256322 | A1* | 9/2014 | Zhou | H04W 36/20 455/436 |
| 2015/0365154 | A1* | 12/2015 | Davydov | H04B 7/024 370/329 |
| 2016/0255660 | A1* | 9/2016 | Son | H04B 7/0491 |

\* cited by examiner

*Primary Examiner* — Afsar M Qureshi

(57) ABSTRACT

Systems and methods are also described for mitigating interference at an access node. It may determined, based on an interference metric for a first wireless device exceeding an interference criteria, that communication between the first wireless device and a cell of an access node is experiencing interference from a neighboring cell. At least one neighboring cell in which one or more beamformed signals are transmitted is identified as a potential interference source. The identified neighboring cell may be instructed to terminate transmission of a beamformed signal to at least a second wireless device. It may then be determined whether the interference metric for the first wireless device continues to exceed the interference criteria after the termination of the beamformed signal. And the second wireless device may be identified as an interference source when the interference metric for the first wireless device does not continue to exceed the interference criteria.

20 Claims, 12 Drawing Sheets

SYSTEMS AND METHODS FOR MITIGATING INTERFERENCE AT AN ACCESS NODE

TECHNICAL BACKGROUND

Telecommunication systems, such as cellular networks or other wireless networks, provide wireless services to a plurality of wireless devices in a variety of conditions. For example, an access node may serve a group of wireless devices that experience strong signal conditions while other wireless devices experience poor signal conditions. In some cases, a system may leverage various techniques, such as beamforming, to better serve wireless devices with poor signal conditions. However, such techniques may interfere with other communication between the access node and wireless devices. Accordingly, a system that effectively detects interference caused by such techniques and, in some cases, effectively mitigates the interference can provide enhanced service to users of the system.

OVERVIEW

Systems and methods are described for detecting interference at an access node. A rate at which packets are unsuccessful received at a wireless device may be monitored, wherein the wireless device is in communication with a cell of an access node. The access node may retransmit one or more unsuccessfully received packets to the wireless device. A retransmission metric for retransmission attempts to the wireless device from the access node may be monitored. And it may be determined that communication between the cell of the access node and the wireless device is experiencing interference from a neighboring cell when the monitored rate and monitored retransmission metric meet the interference criteria.

Systems and methods are also described for mitigating interference at an access node. It may determined, based on an interference metric for a first wireless device exceeding an interference criteria, that communication between the first wireless device and a cell of an access node is experiencing interference from a neighboring cell. At least one neighboring cell in which one or more beamformed signals are transmitted is identified as a potential interference source. The identified neighboring cell may be instructed to terminate transmission of a beamformed signal to at least a second wireless device. It may then be determined whether the interference metric for the first wireless device continues to exceed the interference criteria after the termination of the beamformed signal. And the second wireless device may be identified as an interference source when the interference metric for the first wireless device does not continue to exceed the interference criteria.

Systems and methods are also described for mitigating interference at an access node. It may be determined, based on an interference metric for a first wireless device exceeding an interference criteria, that communication between the first wireless device and a cell of an access node is experiencing interference from a neighboring cell. A second wireless device receiving a beamformed transmission may be identified, wherein the beamformed transmission to the second wireless device is identified as an interference source for communication between the first wireless device and the cell of the access node. Transmissions to the first wireless device and the second wireless device may be scheduled such that the scheduled timings for transmissions to the first wireless device are different from the scheduling timings for transmissions to the second wireless device.

DETAILED DESCRIPTION

Systems and methods are described for detecting interference at an access node. For example, a wireless device in communication with an access node my experience interference. In an embodiment, a rate at which packets are unsuccessfully received at the wireless device and a retransmission metric (e.g., number of retransmission attempts for a packet that is eventually successfully received at the wireless device) may indicate a type of interference. For example, based on the rate and the retransmission metric for the wireless device, it may be detected that the wireless device is experiencing grating lobe interference caused by a beamformed signal transmitted from a neighboring cell (e.g., a neighboring cell at the access node).

Once such detection is performed, systems and methods may be leveraged to mitigate the experienced interference. In some embodiments, a wireless device may be identified as a source of the grating lobe interference because a beamformed signal transmitted from the neighboring cell of the access node to the identified wireless device is determined to be causing the grating lobe interference. For instance, this may be determined by instructing the access node to terminate transmission of the beamformed signal to the identified wireless devices and then monitoring the experienced interference. Where the experienced interference drops (e.g., drops below a threshold), the wireless device may be identified as a source for the grating lobe interference. In some examples, the access node may be instructed to refrain from transmitting a beamformed signal to the identified wireless device for a period of time.

In another embodiment, once it is detected that communication between the cell of the access node and the wireless device is experiencing grating lobe interference, and a wireless device has been identified as a source for that interference (e.g., based on a beamformed signal transmitted to the wireless device), one or more schedulers may be used to mitigate the interference. For example, one or more schedulers for the cells of the access node may be instructed to schedule transmissions to the two wireless devices at different times (e.g., separated by at least a delta time). In some instances, the delta time between scheduled transmissions will mitigate against the experienced interference.

Figure 1:
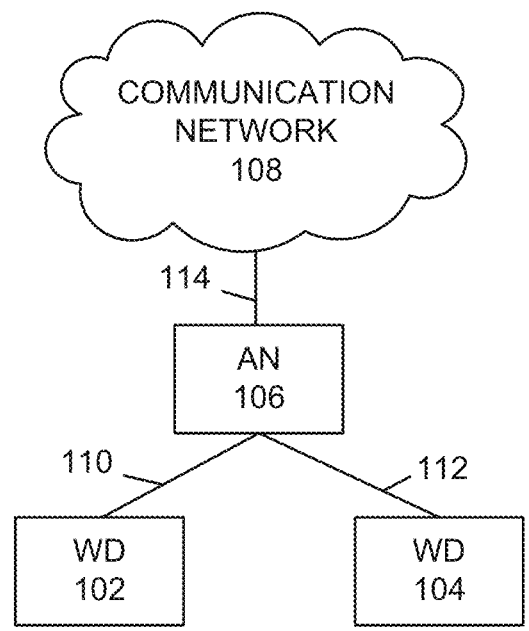
FIG. 1 illustrates an exemplary communication system to detect interference at an access node.

FIG. 1 illustrates an exemplary communication system 100 detect interference at an access node comprising wireless devices 102 and 104, access node 106, communication network 108, and communication links 110, 112, and 114. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 106 and communication network 108 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while two wireless devices are illustrated in FIG. 1 as being in communication with access node 106, any number of wireless devices can be implemented.

Access node 106 is a network node capable of providing wireless communications to wireless devices 102 and 104, and can be, for example, a base transceiver station, a radio base station, and an eNodeB device. Access node 106 may communicate with communication network 108 over communication link 114. Although only access node 106 is illustrated in FIG. 1, wireless devices 102 and 104 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, and 114, can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
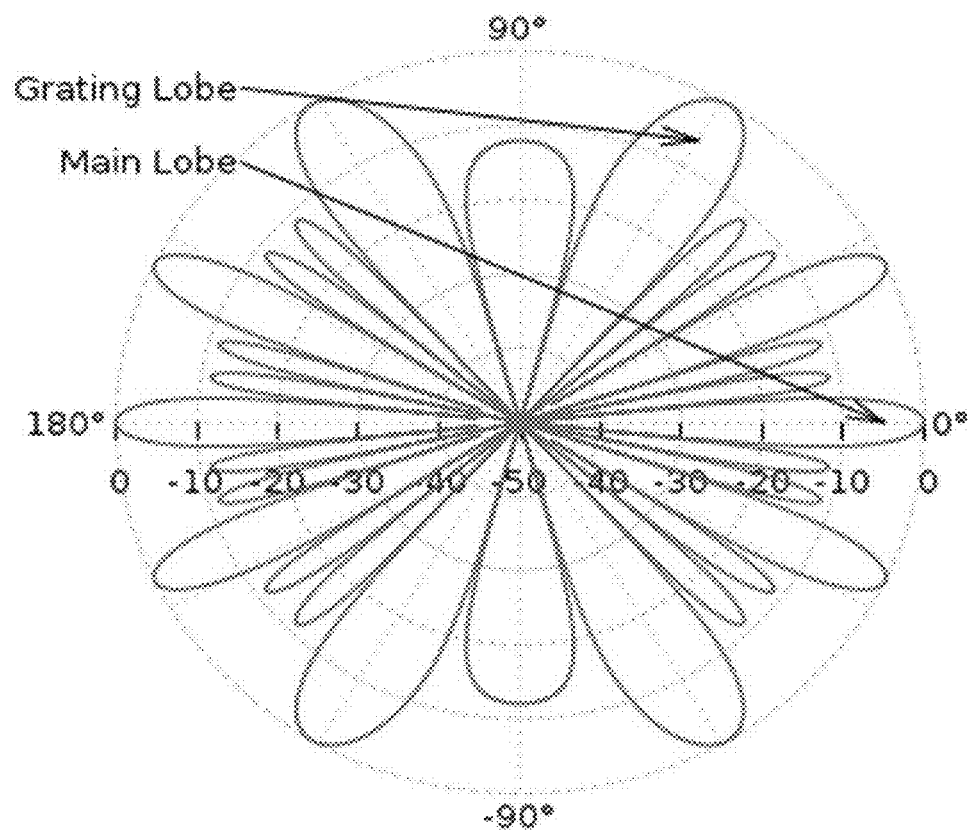
FIG. 2 illustrates an exemplary diagram of beamformed signals transmitted from an access node.

FIG. 2 illustrates an exemplary diagram 200 of signal lobes for a beamformed signal according to an embodiment. For example diagram 200 shows one or more main lobes and one or more grating lobes. In an embodiment, a main lobe may comprise a signal transmitted from an access node toward a wireless device in order to enhanced signal conditions for the wireless device. The main lobe may be transmitted to the wireless device as a beamformed signal In an embodiment, beamforming may be accomplished using a plurality of antennas at an access node that implements, for example, a multiple input multiple output (MIMO) protocol. The signals from each of the plurality of antennas may be controlled such that the net signal from the access node may be transmitted towards wireless device as a beamformed signal. In an embodiment, the beam may be formed by weighting the magnitude and/or phase of the signals transmitted by each individual antenna. For example, the signals may be weighted such that the emitted waveform from the antennas experiences constructive interference in the direction of the wireless device.

In some embodiments, one or more side lobes, or grating lobes, may be created as a result of the beamformed signal. For example, the weighting applied to the antennas of the access node may cause a plurality of additional lobes to also be transmitted from the access node along with the beamformed signal. As illustrated in FIG. 2, the side lobes or grating lobes may be of different shapes and sizes, and may be transmitted from the access node at a plurality of angles. In an embodiment, the size, shape, and angle that side lobes or grating lobes take may be based on the location for the wireless device receiving the beamformed transmission. This is because the antenna weighting used to achieve beamforming is based on the location of the wireless device.

Figure 3:
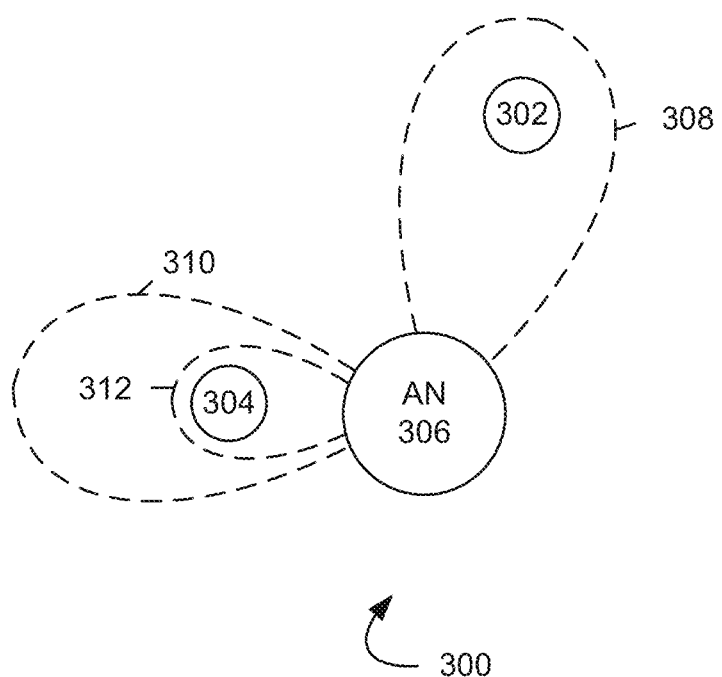
FIG. 3 illustrates an exemplary communication system to detect interference at an access node and mitigate the detected interference.

FIG. 3 illustrates a system 300 for detecting interference at an access node and mitigating the interference according to an embodiment. System 300 comprises wireless devices 302 and 304, access node 306, beamformed signals 308 and 310, and grating lobe 312. Wireless devices 302 and 304 may comprise devices similar to wireless device 102. Access node 306 may comprise an access node similar to access node 106.

In operation, access node 306 may establish communication with wireless devices 302 and 304 such that access node 306 provides the wireless devices access to a communication network (e.g., communication network 108). In an embodiment, system 300 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, wireless devices 302 and 304 may be located in different cells (or sectors) of access node 306. For example, access node 306 may be segmented into a plurality of sectors each comprising an arch (e.g., 60°, 90°, 120°, and the like). Each cell may include its own set of wireless resources (e.g., frequency bands for providing wireless service) and, in some examples, its own scheduler for scheduling transmissions to wireless devices. In some embodiments, cells of access node 306 may reuse wireless resources in order to provide wireless services. For example, a wireless device in a first cell of access node 306 may be assigned to communicate using a first frequency band, and a wireless device in a second cell of access node 308 may similarly be assigned to communicate using the first frequency band. System 300 may leverage a transmission protocol that limits or mitigates against the interference caused by such resource reuse (e.g., the LTE protocol).

In an embodiment, system 300 may leverage beamforming to enhance the wireless services provided to wireless devices 302 and 304. For example, one or more of wireless device 302 and 304 may experience poor channel conditions, and the wireless devices may therefore comprise a low channel quality (e.g., a channel quality indicator (CQI) below a threshold). The low channel quality may be based on a high interference level, distance from access node 306, or other suitable factors. In an embodiment, access node 306 may perform beamforming such that a signal transmitted to wireless device 302 is adjusted based on the location of the wireless device. For example, beamformed signal 308 may be transmitted from access node 306 such that wireless device 302 may experience greater channel quality when communicating with access node 306. In an embodiment, the beamformed signal 308 may comprise of signals transmitted over a frequency band assigned to wireless device 302 (e.g., assigned as the frequency band that access node 306 uses to communicate with wireless device 302).

In an embodiment, beamformed signal 310 may similarly be transmitted from access node 306 such that wireless device 304 may experience greater channel quality when communicating with access node 306. In other examples, access node 306 may communicate with wireless device 304 using a non-beamformed signal (e.g., default signal). In an embodiment, the beamformed signal 308 transmitted to wireless device 302 may cause one or more side lobes or grating lobes, as described herein. For example, grating lobe 312 may be transmitted from access node 306 as a result of beamformed signal 308.

In the embodiment illustrated in FIG. 3, grating lobe 312 may interfere with communication between wireless device 304 and access node 306. However, in some instances, the interference may go undetected based on the channel conditions reported by wireless device 304. For example, wireless device 304 may receive a reference signal from access node 306 at a certain signal level (e.g., reference signal received power, RSRP). Based on the received signal level (RSRP), wireless device 304 may report channel conditions to access node 306 (e.g., reported CQI). The channel conditions may then be used by access node 306 to determine certain transmission parameters for wireless device 304 (e.g., modulation and coding scheme (MCS), priority, and the like). However, beamformed signal 308 and resultant grating lobe 312 transmitted from access node 306 may be transmitted over data carrying signals (e.g., resource blocks used for carrying user data), not over reference signals (e.g., resource blocks used for carrying reference signals or pilot signals). For instance, considering an LTE implementation, data carrying signals may be transmitted over a Physical Downlink Shard Channel (PDSCH), used for carrying user data to and from wireless devices. Reference signals may be transmitted across various channels, but may be limited to certain resource blocks within a frame or subframe (e.g., predetermined resource blocks according to a particular pattern).

Because of this, the received signal level for a reference signal at wireless device 304 from access node 306 may not experience the same interference as a received signal level for data carrying signals received at wireless device 304 from access node 306. This mismatch may cause wireless device 304 to suffer from poor channel conditions due to interference that goes undetected. Accordingly, a system that effectively detects and, in some instances, mitigates such interference may provide enhanced wireless service to users of the system.

Figure 4:
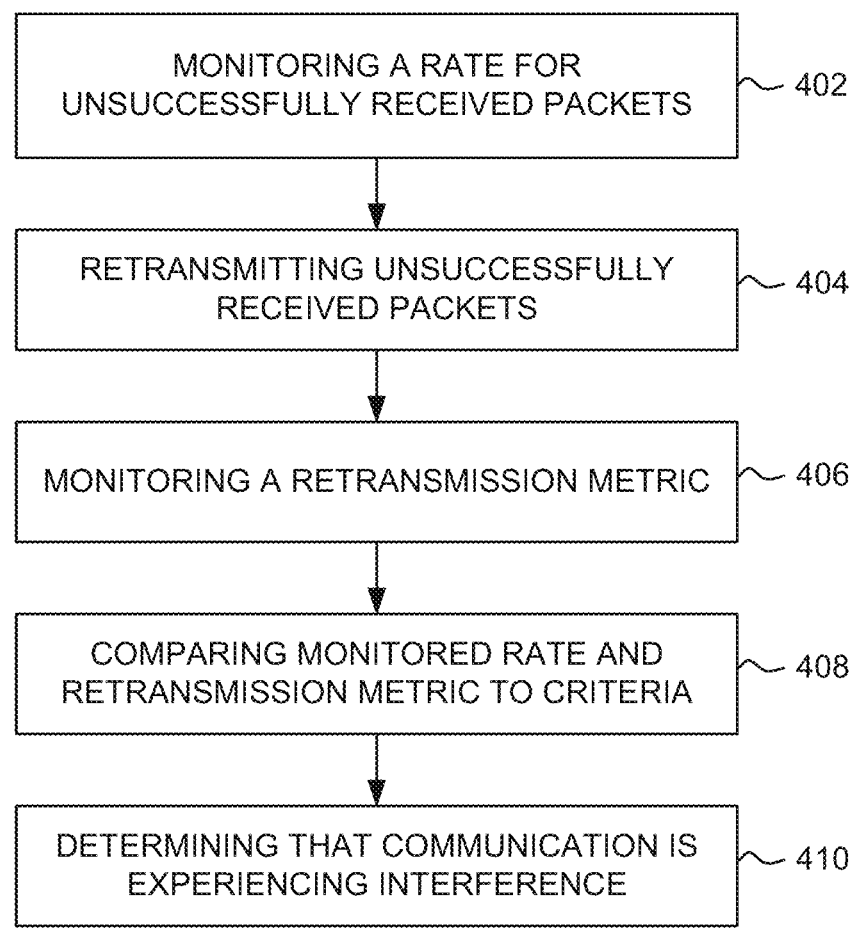
FIG. 4 illustrates an exemplary method of detecting interference at an access node.

FIG. 4 illustrates an exemplary method for detecting interference at an access node according to an embodiment. The method will be discussed with reference to the exemplary communication system 300 illustrated in FIG. 3, however, the method can be implemented with any suitable communication system.

Referring to FIG. 4, at step 402, a rate at which packets are unsuccessful received at a wireless device may be monitored, wherein the wireless device is in communication with a cell of an access node. For example, a rate at which packets are unsuccessfully received at wireless device 304 may be monitored. The unsuccessfully received packets may be transmitted by access node 306. In an embodiment, the rate may comprise a block error rate (BLER) for wireless device 304.

At step 404, the access node may retransmit one or more unsuccessfully received packets to the wireless device. For example, access node 306 may retransmit one or more unsuccessfully recited packets to wireless device 304. For example, the retransmissions may be part of an automatic repeat request (ARQ) or hybrid automatic repeat request (HARD) protocol.

At step 406, a retransmission metric for retransmission attempts to the wireless device from the access node may be monitored. For example, a retransmission metric for retransmission attempts from access node 306 to wireless device 304 may be monitored. In an embodiment, the monitored retransmission metric may comprise the number of retransmission attempts for a packet that is eventually successfully received at wireless device 304.

At step 408, the monitored rate and the monitored retransmission metric may be compared to an interference criteria. For example, the monitored rate and the monitored retransmission metric may each be compared to a threshold for the values.

At step 410, it may be determined that communication between the cell of the access node and the wireless device is experiencing interference from a neighboring cell when the monitored rate and monitored retransmission metric meet the interference criteria. For example, it may be determined that communication between the cell of access node 306 and wireless device 304 is experiencing interference from a neighboring cell (e.g., neighboring cell of access node 306). In an embodiment, it may be determined that the interference caused comprises grating lobe interference.

Figure 5:
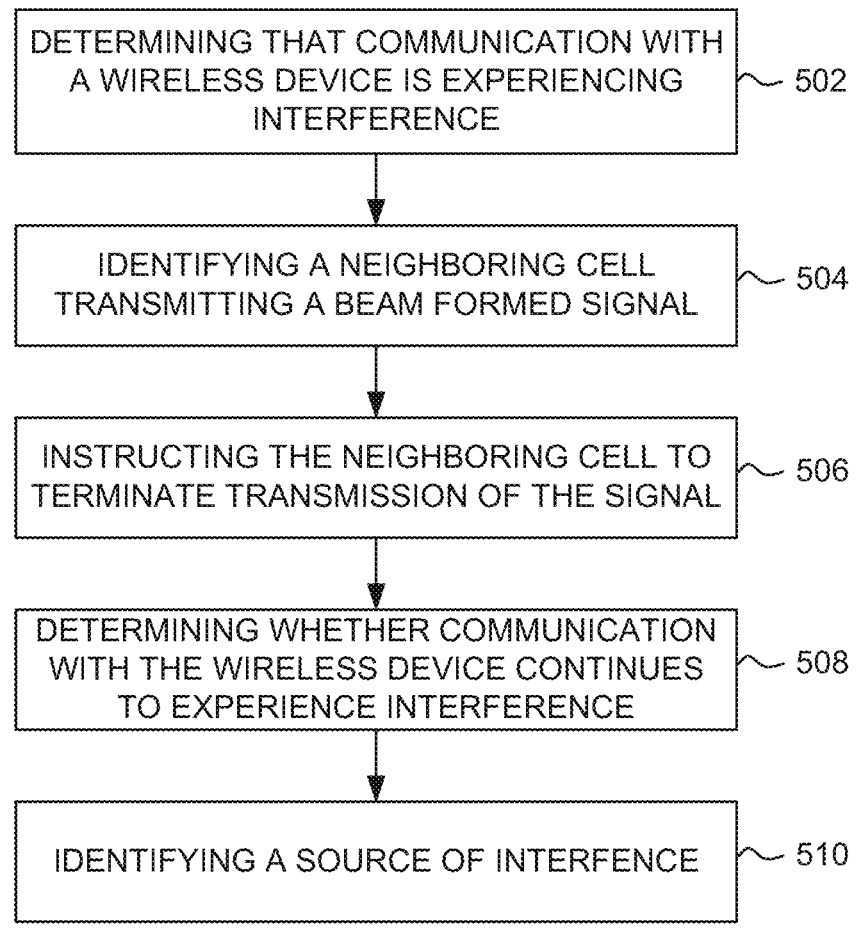
FIG. 5 illustrates an exemplary method of mitigating interference at an access node.

FIG. 5 illustrates an exemplary method for mitigating interference at an access node according to an embodiment. The method will be discussed with reference to the exemplary communication system 300 illustrated in FIG. 3, however, the method can be implemented with any suitable communication system.

Referring to FIG. 5, at step 502, it may be determined, based on an interference metric for a first wireless device exceeding an interference criteria, that communication between the first wireless device and a cell of an access node is experiencing interference from a neighboring cell. For example, wireless device 304 may be in communication with a cell of access node 306. An interference metric for wireless device 304 may be monitored and compared to an interference criteria. In an embodiment, after the comparison it may be determined that the monitored interference metric exceeds the interference criteria. Based on the comparison, it may be determined that communication between wireless device 304 and the cell of access node 306 is experiencing interference from a neighboring cell (e.g., a neighboring cell of access node 306).

At step 504, at least one neighboring cell in which one or more beamformed signals are transmitted is identified as a potential interference source. For example, a neighboring cell of access node 306 transmits a beamformed signal to wireless device 302. Accordingly, the neighboring cell may be identified as a potential interference source.

At step 506, the identified neighboring cell may be instructed to terminate transmission of a beamformed signal to at least one second wireless device. For example, the neighboring cell of access node 306 may be instructed to terminate the beamformed signal to wireless device 302.

At step 508, it may then be determined whether the interference metric for the first wireless device continues to exceed the interference criteria after the termination of the beamformed signal. For example, the interference metric for wireless device 304 may be monitored after termination of the beamformed signal to wireless device 302. The monitored interference metric may then be compared to the interference metric to determine whether monitored interference metric continues to exceed the interference criteria.

At step 510, the second wireless device may be identified as an interference source when the interference metric for the first wireless device does not continue to exceed the interference criteria. For example, if, after termination of the beamformed signal to wireless device 302, the monitored interference metric for wireless device 304 does not exceed the interference metric, it may be determined that the beamformed signal to wireless device 302 caused the interference for communication between wireless device 304 and access node 306.

Figure 6:
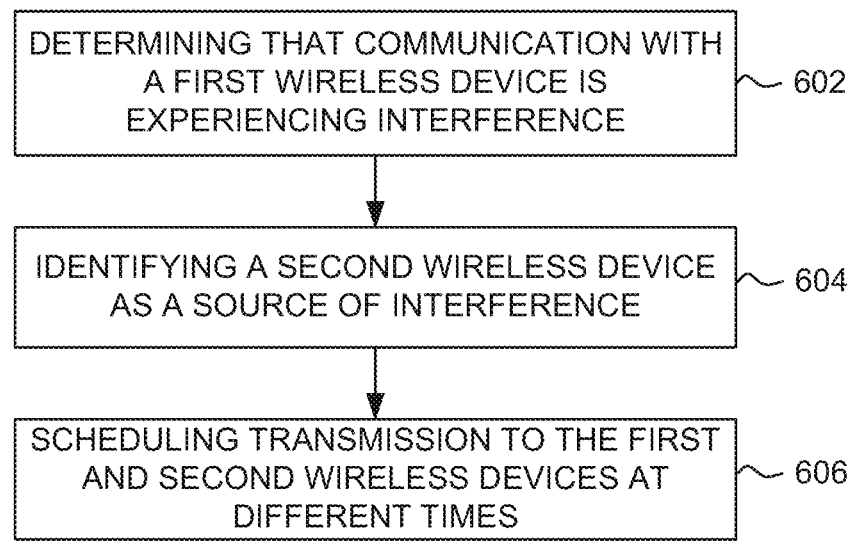
FIG. 6 illustrates another exemplary method of mitigating interference at an access node.

FIG. 6 illustrates another exemplary method for mitigating interference at an access node according to an embodiment. The method will be discussed with reference to the exemplary communication system 300 illustrated in FIG. 3, however, the method can be implemented with any suitable communication system.

Referring to FIG. 6, at step 602, it may be determined, based on an interference metric for a first wireless device exceeding an interference criteria, that communication between the first wireless device and a cell of an access node is experiencing interference from a neighboring cell. For example, wireless device 304 may be in communication with a cell of access node 306. An interference metric for wireless device 304 may be monitored and compared to an interference criteria. In an embodiment, after the comparison it may be determined that the monitored interference metric exceeds the interference criteria. Based on the comparison, it may be determined that communication between wireless device 304 and the cell of access node 306 is experiencing interference from a neighboring cell (e.g., a neighboring cell of access node 306).

At step 604, a second wireless device receiving a beamformed transmission may be identified, wherein the beamformed transmission to the second wireless device is identified as an interference source for communication between the first wireless device and the cell of the access node. For example, wireless device 302 may be identified because the wireless device is receiving a beamformed signal (e.g., from access node 306). The second wireless device may further be identified as an interference source for communication between wireless device 304 and the cell of access node 306.

At step 606, transmissions to the first wireless device and the second wireless device may be scheduled such that the scheduled timings for transmissions to the first wireless device are different from the scheduling timings for transmissions to the second wireless device. For example, transmissions to wireless device 302 and wireless device 304 (e.g., from access node 306) may be scheduled such that the scheduled timings for transmissions to wireless device 302 are different from the scheduling timings for transmissions to wireless device 304. For example, the scheduled timings may differ by at least one or more transmission time intervals (TTIs).

Figure 7:
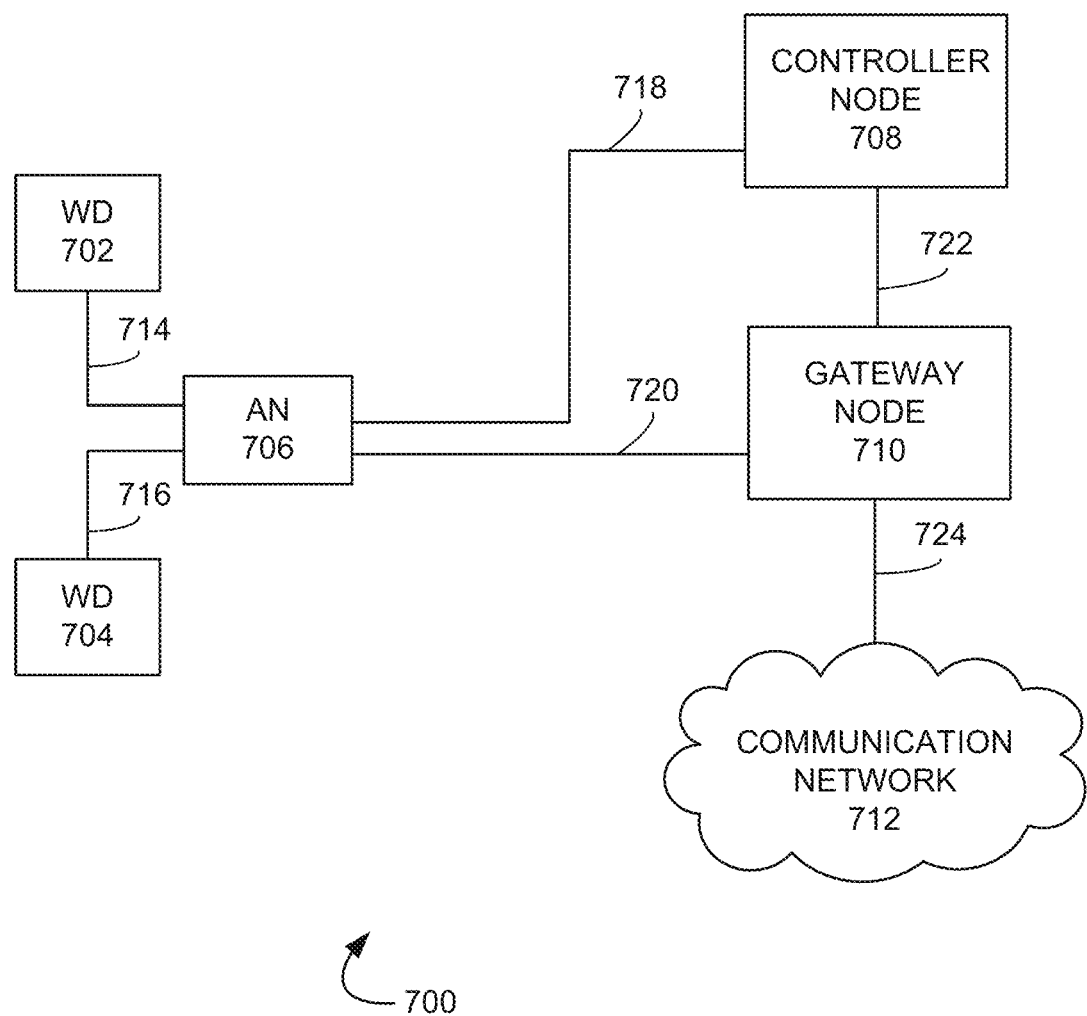
FIG. 7 illustrates another exemplary communication system to detect interference at an access node and mitigate the detected interference.

FIG. 7 illustrates another exemplary communication system 700 to detect and mitigate interference at an access node. Communication system 700 may comprise wireless devices 702 and 704, access node 706, controller node 708, gateway node 710, communication network 712, and communication links 714, 716, 718, 720, 722, and 724. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 702 and 704 can be any device configured to communicate over communication system 700 using a wireless communication link. For example, wireless devices 702 and 704 can include a cell phone, a smart phone, a computing platform such as a laptop, palmtop, or a tablet, a personal digital assistant, or an internet access device, and combinations thereof.

Access node 706 is a network node capable of providing wireless communications to wireless devices 702 and 704, and can be, for example, a base transceiver station, a radio base station, or an eNodeB device. In an embodiment, access node 706 can comprise a serving access node for wireless device 702 and 704. Access node 706 may communicate with controller node 708 over communication link 718, and with gateway node 710 over communication link 720.

Controller node 708 can be any network node configured to manage services within system 700. Controller node 708 may provide other control and management functions for system 700. The controller node 708 can be a single device having various functions or a plurality of devices having differing functions. For example, controller node 708 can include at least one of a multi-cell/multicast coordination entity (MCE), a mobility management entity (MME), a radio network controller (RNC), a mobile switching center (MSC), and a combination thereof.

Controller node 708 can comprise a processor and associated circuitry to execute or direct the execution of computer-readable instructions to obtain information. Controller node 708 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 708 can receive instructions and other input at a user interface. Controller node 708 can comprise a processor and associated circuitry to execute or direct the execution of computer-readable instructions to obtain information.

Gateway node 710 is a network element which can comprise a processor and associated circuitry to execute or direct the execution of computer-readable instructions. Gateway node 710 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 710 can provide instructions to access node 706 related to channel selection in communications with wireless devices 702 and 704. For example, gateway node 710 can comprise at least one of a serving gateway (SGW), a packet data network gateway (PDNGW), a cellular gateway (CGW), and a combination thereof.

Communication network 712 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 712 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 712 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 714, 716, 718, 720, 722, and 724 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 700 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 706, controller node 708, gateway node 710, and communication network 712 which are omitted for clarity, including additional processing nodes, routers, gateways, and physical and/or wireless data links for carrying data among the various network elements. In an embodiment, any of controller node 708, gateway node 710, and one or more modules of access node 706 may perform all or parts of the methods of FIGS. 4-6 and 9-11.

Figure 8:
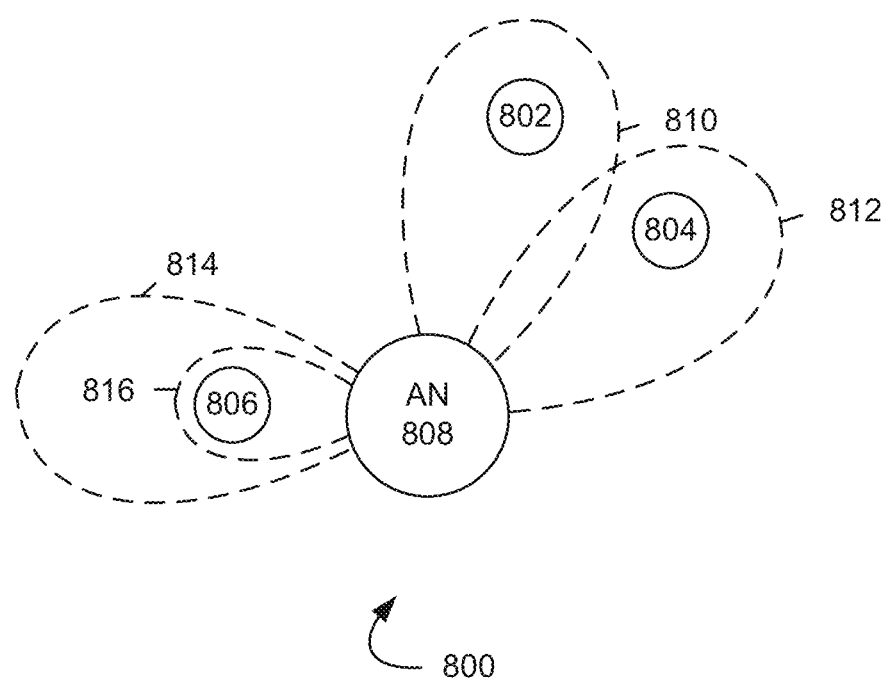
FIG. 8 illustrates another exemplary communication system to detect interference at an access node and mitigate the detected interference.

FIG. 8 illustrates a system 800 for detecting and mitigating interference at an access node according to an embodiment. System 800 comprises wireless devices 802, 804, and 806, access node 808, beamformed signals 810, 812, and 814, and grating lobe 816. Wireless devices 802, 804, and 806, may comprise devices similar to wireless device 402. Access node 808 may comprise an access node similar to access node 406.

In operation, access node 808 may establish communication with wireless devices 802, 804, and 806 such that access node 808 provides the wireless devices access to a communication network (e.g., communication network 712). In an embodiment, system 800 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, wireless devices 806 may be located in a different cell (or sector) of access node 808 than wireless device 802 and 804. For example, access node 808 may be segmented into a plurality of sectors each comprising an arch (e.g., 60°, 90°, 120°, and the like). Each cell may include its own set of wireless resources (e.g., frequency bands for providing wireless service) and, in some examples, its own scheduler for scheduling transmissions to wireless devices. In some embodiments, cells of access node 808 may reuse wireless resources in order to provide wireless services. For example, a wireless device in a first cell of access node 808 may be assigned to communicate using a first frequency band, and a wireless device in a second cell of access node 808 may similarly be assigned to communicate using the first frequency band. System 800 may leverage a transmission protocol that limits or mitigates against the interference caused by such resource reuse (e.g., the LTE protocol).

In an embodiment, system 800 may leverage beamforming to enhance the wireless services provided to wireless devices 802, 804, and 806. In an embodiment, access node 808 may perform beamforming such that a signal transmitted to wireless device 802 is adjusted based on the location of the wireless device. For example, beamformed signal 810 may be transmitted from access node 808 such that wireless device 802 may experience greater channel quality when communicating with access node 808. In an embodiment, beamformed signal 810 may comprise of signals transmitted over a frequency band assigned to wireless device 802 (e.g., assigned as the frequency band that access node 808 uses to communicate with wireless device 802).

In an embodiment, beamformed signal 812 may similarly be transmitted from access node 808 such that wireless device 804 may experience greater channel quality when communicating with access node 808 and beamformed signal 814 may similarly be transmitted from access node 808 such that wireless device 806 may experience greater channel quality when communicating with access node 808. In other examples, access node 808 may communicate with wireless device 806 using a non-beamformed signal (e.g., default signal). In an embodiment, beamformed signal 810 transmitted to wireless device 802 and/or beamformed signal 812 transmitted to wireless device 804 may cause one or more side lobes or grating lobes, as described herein. For example, grating lobe 816 may be transmitted from access node 808 as a result of one or both of beamformed signals 810 and 812.

In the embodiment illustrated in FIG. 8, grating lobe 816 may interfere with communication between wireless device 806 and access node 808. However, in some instances, the interference may go undetected based on the channel conditions reported by wireless device 806. For example, wireless device 806 may receive a reference signal from access node 808 at a certain signal level (e.g., reference signal received power, RSRP). Based on the received signal level (RSRP), wireless device 806 may report channel conditions to access node 808 (e.g., reported CQI). The channel conditions may then be used by access node 808 to determine certain transmission parameters for wireless device 806 (e.g., modulation and coding scheme (MCS), and the like). However, beamformed signals 810, 812, and 814, and grating lobe 816 transmitted from access node 808 may be transmitted over data carrying signals (e.g., resource blocks used for carrying user data), not over reference signals (e.g., resource blocks used for carrying reference signals or pilot signals). For instance, considering an LTE implementation, data carrying signals may be transmitted over a Physical Downlink Shard Channel (PDSCH), used for carrying user data to and from wireless devices. Reference signals may be transmitted across various channels, but may be limited to certain resource blocks within a frame or subframe (e.g., predetermined resource blocks according to a particular pattern).

Because of this, the received signal level for a reference signal at wireless device 806 from access node 808 may not experience the same interference as a received signal level for data carrying signals received at wireless device 806 from access node 808. This mismatch may cause wireless device 806 to suffer from poor channel conditions due to interference that goes undetected. Accordingly, a system that effectively detects such interference and, in some instances, mitigates the interference may provide enhanced wireless service to users of the system.

Figure 9:
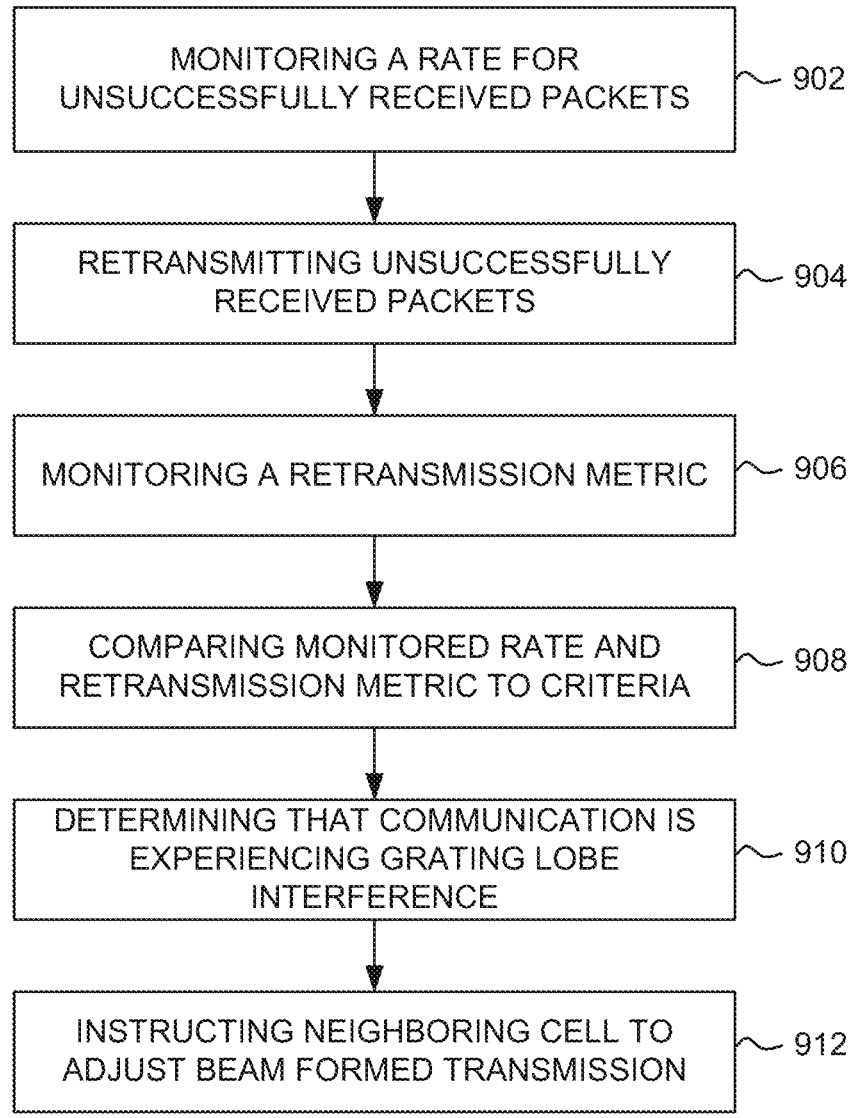
FIG. 9 illustrates another exemplary method of detecting interference at an access node.

FIG. 9 illustrates an exemplary method for detecting interference at an access node according to an embodiment. The method will be discussed with reference to the exemplary communication system 800 illustrated in FIG. 8, however, the method can be implemented with any suitable communication system.

Referring to FIG. 9, at step 902, a rate at which packets are unsuccessful received at a wireless device may be monitored, wherein the wireless device is in communication with a cell of an access node. For example, a rate at which packets are unsuccessfully received at wireless device 806 may be monitored. The unsuccessfully received packets may be transmitted by access node 808, where wireless device 806 is in communication with a cell of access node 808. In an embodiment, the rate may comprise a block error rate (BLER) for wireless device 806. In another embodiment, the rate may comprise a packet error rate (PER) for wireless device 806.

At step 904, the access node may retransmit one or more unsuccessfully received packets to the wireless device. For example, access node 808 may retransmit one or more unsuccessfully recited packets to wireless device 806. For example, the retransmissions may be part of an automatic repeat request (ARQ) or hybrid automatic repeat request (HARQ) protocol. In an embodiment, access node 808 may implement a HARQ protocol such that a NACK message received from a wireless device indicates data (e.g., a packet) was not successfully received at the wireless device. Based on the HARQ protocol, access node 808 may retransmit the data (e.g., packet) associated with the NACK message so that it may be successfully received by the wireless device. In an embodiment, a NACK may be received from a wireless device based on a retransmitted packet from access node 808, and thus access node 808 may retransmit the packet again according to the HARQ protocol. A packet may be retransmitted a number of times until a maximum HARQ retransmission threshold is reached (e.g., maximum of four retransmissions).

In an embodiment, the monitored rate may comprise a BLER for wireless device 806, where BLER is based on an error rate per each transmission. Accordingly, errors that lead to HARQ retransmissions may each contribute to the BLER even when retransmissions eventually lead to successfully received data. In another embodiment, a monitored PER may discount an error when HARQ retransmissions succeed and the data associated with an unsuccessfully received packet is eventually received at wireless device 806. In other words, BLER may account for each reception error even when the HARQ protocol corrects the reception error with retransmissions. PER may not account for errors that HARQ retransmissions eventually correct, and thus these errors may be masked. This difference may be based on the various Open Systems Interconnection (OSI) layers, or network stack layers, for the two rates. BLER is relative to the physical (PHY) layer of the OSI model while PER is relative to the network layer or data link (MAC) layer of the OSI model. For instance, for wireless links, often the data link (MAC) layer is leveraged to provide error free packets to the network layer, and thus HARQ retransmissions may correct errors at the data link (MAC) layer such that the error is not perceived at the network layer.

In an embodiment, one of BLER and PER may be monitored and further implemented (e.g., as a BLER or PER threshold) based on the interference experienced. In an embodiment, each of a consistent interference or an inconsistent interference may have a different affect on BLER than on PER, or analysis of each rate may detect different types of interference. Accordingly, detection embodiments may leverage one or both rates in order to provide robust interference detection.

At step 906, a retransmission metric for retransmission attempts to the wireless device from the access node may be monitored. For example, a retransmission metric for retransmission attempts from access node 808 to wireless device 806 may be monitored.

In an embodiment, the monitored retransmission metric may comprise the number of retransmission attempts for a packet that is eventually successfully received at wireless device 806. For example, based on a HARQ protocol, access node 808 may retransmit one or more packets to wireless device 806 when the wireless device transmits a NACK message back to the access node. In some instances, a retransmitted packet based on the HARQ protocol may also be unsuccessfully received at wireless device 806, and thus access node 808 may retransmit the packet again. The retransmissions may continue until the packet is successfully received or the HARQ retransmission threshold is reached (e.g., maximum of four retransmissions).

In an embodiment, the monitored retransmission metric may comprise the average number of retransmission attempts from access node 808 for packets that are eventually successfully received at wireless device 806. In this example, HARQ retransmissions may be analyzed such that the number of retransmission attempts for each packet that is eventually successfully received at wireless device 806 based on the HARQ protocol may be determined, and this number may then be divided by the number of packets that triggered the HARQ protocol to arrive at an average number of retransmissions. For instance, a first, second, and third packet may each trigger the HARQ protocol, where each packet is also eventually successfully received at wireless device 806. The first packet may have taken 2 retransmissions, the second packet may have taken 3 retransmissions, and the third packet may have taken 4 retransmissions. Thus, the average number of retransmissions for these three packets may comprise (2+3+4)/3, or 3.

In another embodiment, the monitored retransmission metric may comprise the average number of retransmission attempts from access node 808 for packets that are eventually successfully received at wireless device 806 and for packets that are not eventually successfully received at wireless device 806. For instance, the average number of retransmission attempts from access node 808 for a packet that is not successfully received at wireless device 806 after HARQ retransmissions will comprise the HARQ retransmission threshold.

At step 908, the monitored rate and the monitored retransmission metric may be compared to an interference criteria. For example, the monitored rate and the monitored retransmission metric may each be compared to a threshold for the values.

In an embodiment, the monitored rate may comprise a BLER rate, and the interference criteria may include a BLER threshold. For instance, the BLER threshold may be the expected BLER without grating lobe interference (e.g., 10%, 15%, and the like). The BLER threshold may be theoretically derived or may be based on historical data.

In an embodiment, the monitored retransmission metric may comprise an average number of retransmission attempts for successfully received packets at wireless device 806 based on a HARQ protocol, and the interference criteria may include a number of retransmissions threshold. For instance, the number of retransmissions threshold may be the expected number of retransmissions without grating lobe interference (e.g., 1, 2, 3, and the like). The number of retransmissions threshold may be theoretically derived or may be based on historical data. In another embodiment, the monitored retransmission metric may comprise an average number of retransmission attempts for successfully received packets at wireless device 806 based on a HARQ protocol and unsuccessfully received packets at wireless device 806 based on the HARQ protocol, and the interference criteria may include a number of retransmissions threshold.

At step 910, it may be determined that communication between the cell of the access node and the wireless device is experiencing interference from a neighboring cell when the monitored rate and monitored retransmission metric meet the interference criteria. For example, it may be determined that communication between the cell of access node 808 and wireless device 806 is experiencing interference from a neighboring cell (e.g., neighboring cell of access node 808). In an embodiment, it may be determined that the interference caused comprises grating lobe interference.

For example, the monitored rate may comprise a BLER for wireless device 806, the monitored retransmission metric may comprise an average number of retransmission attempts for successfully received packets at wireless device 806 based on a HARQ protocol, and the interference criteria may include a BLER threshold and a number of retransmissions threshold. In an embodiment, where the monitored BLER (meets or) exceeds the BLER threshold and the monitored average number of retransmission attempts for successfully received packets (meets or) exceeds a number of retransmissions threshold, it may be determined that communication between the cell of access node 808 and wireless device 806 is experiencing interference from a neighboring cell. In another embodiment, where the monitored BLER (meets or) exceeds the BLER threshold or the monitored average number of retransmission attempts for successfully received packets (meets or) exceeds a number of retransmissions threshold, it may be determined that communication between the cell of access node 808 and wireless device 806 is experiencing interference from a neighboring cell.

At step 912, at least one neighboring cell may be instructed to adjust a transmission based on the determination that communication between the cell of the access node and the wireless device is experiencing interference from a neighboring cell. For example, at least one neighboring cell of access node 808 may be instructed to adjust a beamformed transmission to one or more wireless devices based on the determination that communication between the cell of access node 808 and wireless device 806 is experiencing interference from a neighboring cell (e.g., grating lobe interference). Various examples and embodiments that describe techniques for adjusting transmissions from a neighboring cell are further described herein.

Figure 10:
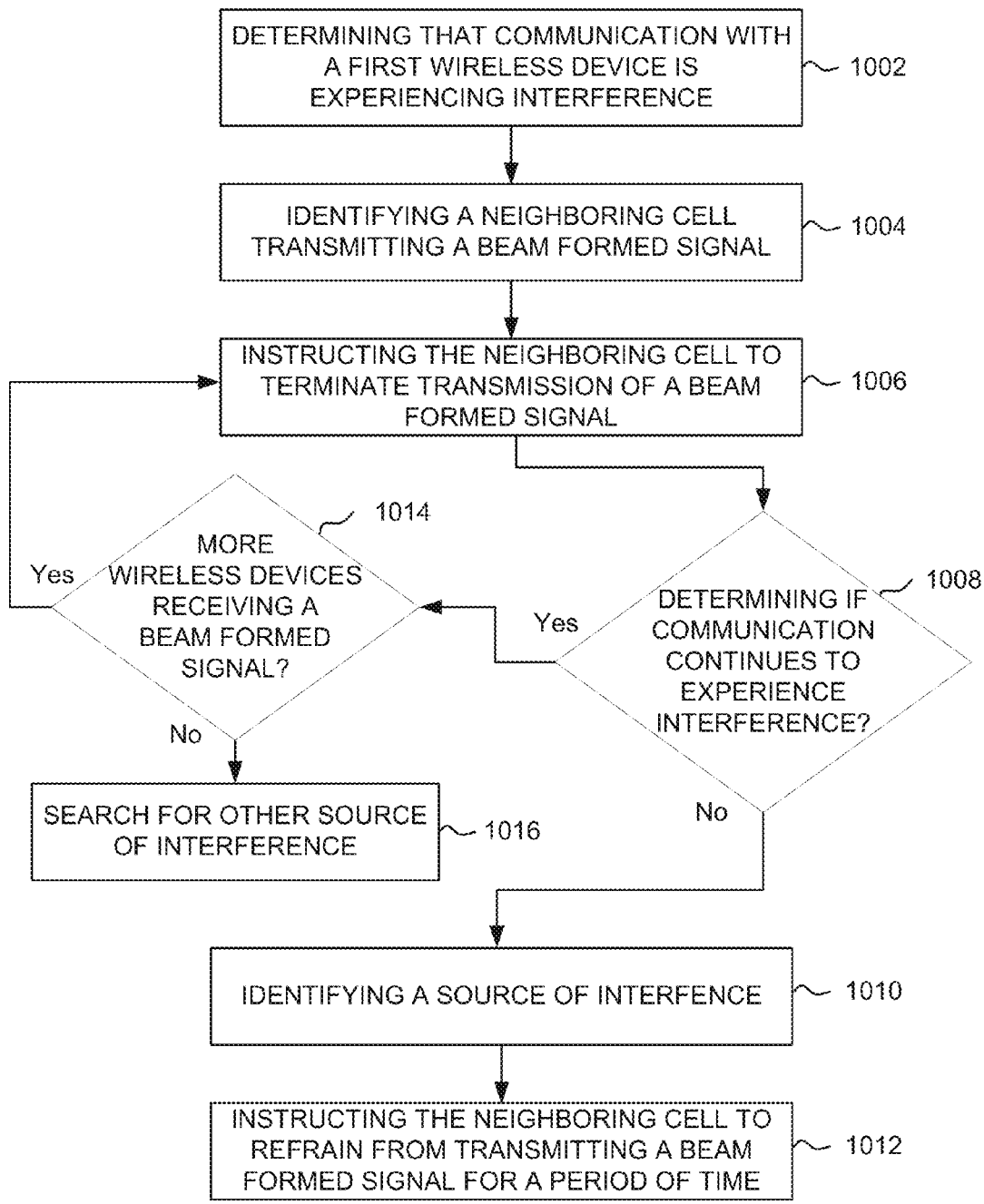
FIG. 10 illustrates another exemplary method of mitigating interference at an access node.

FIG. 10 illustrates an exemplary method for mitigating interference at an access node according to an embodiment. The method will be discussed with reference to the exemplary communication system 800 illustrated in FIG. 8, however, the method can be implemented with any suitable communication system.

Referring to FIG. 10, at step 1002, it may be determined, based on an interference metric for a first wireless device exceeding an interference criteria, that communication between the first wireless device and a cell of an access node is experiencing interference from a neighboring cell. For example, wireless device 806 may be in communication with a cell of access node 808. An interference metric for wireless device 806 may be monitored and compared to an interference criteria. In an embodiment, after the comparison it may be determined that the monitored interference metric (meets or) exceeds the interference criteria. Based on the comparison, it may be determined that communication between wireless device 806 and a cell of access node 808 is experiencing interference from a neighboring cell (e.g., a neighboring cell of access node 808). For example, the interference may comprise grating lobe interference.

In an embodiment, the interference metric for wireless device 806 may comprise a packet error rate (PER). For example, the PER for wireless device 806 may be monitored while the wireless device is in communication with a cell of access node 808. It may then be determined that the monitored packet error rate (meets or) exceeds an interference criteria, where the interference criteria may comprise a PER threshold. The PER threshold may be based on an expected PER when grating lobe interference is not experienced, and may be theoretically derived or may be based on historical data. In an embodiment, based on the monitored packet error rate exceeding the packet error rate threshold, it may be determined that communication between wireless device 806 and the cell of access node 808 is experiencing grating lobe interference from a beamformed signal transmitted by a neighboring cell (e.g., neighboring cell of access node 808). Various other detection techniques for detecting that communication is experiencing grating lobe interference may also be implemented, as described herein. For instance, one or more of a BLER for wireless device 806 and a number of retransmission attempts from access node 808 to wireless device 806 may be monitored and compared to an interference criteria.

At step 1004, at least one neighboring cell in which one or more beamformed signals are transmitted is identified as a potential interference source. For example, a neighboring cell of access node 808 transmits a beamformed signal to wireless device 802 and wireless device 804. Accordingly, the neighboring cell is identified as a potential interference source. Other neighboring cells (e.g., of access node 808) may similarly be identified when the neighboring cells transmit one or more beamformed signals to a wireless device.

At step 1006, the identified neighboring cell may be instructed to terminate transmission of a beamformed signal to at least one second wireless device. For example, the neighboring cell of access node 808 may be instructed to terminate the beamformed signal to wireless device 802. The instruction to terminate the beamformed signal may be valid for a predetermined period of time.

At step 1008, it may then be determined whether the interference metric for the first wireless device continues to (meet or) exceed the interference criteria after the termination of the beamformed signal. For example, the interference metric for wireless device 806 may be monitored after termination of the beamformed signal to wireless device 802. The monitored interference metric may then be compared to the interference criteria to determine whether monitored interference metric continues to (meet or) exceed the interference criteria.

In an embodiment, the monitored interference metric may comprise a PER for wireless device 806, and it may be determined whether the monitored PER for wireless device 806 continues to meet or exceed a PER threshold after the beamformed signal to wireless device 802 has been terminated. In other embodiments, one or more of a BLER for wireless device 806 and a number of retransmission attempts from access node 808 to wireless device 806 may be monitored after the beamformed signal to wireless device 802 has been terminated, and the monitored values may be compared to an interference criteria. The method of FIG. 10 may progress from step 1008 to step 1010 when it is determined that interference metric for wireless device 806 (e.g., monitored PER after the termination of the beamformed signal to wireless device 802) does not continue to (meet or) exceed the interference criteria At step 1010, the second wireless device may be identified as an interference source when the interference metric for the first wireless device does not continue to exceed the interference criteria. For example, if, after termination of the beamformed signal to wireless device 802, the monitored interference metric for wireless device 806 does not (meet or) exceed the interference criteria, it may be determined that the beamformed signal to wireless device 802 caused the interference (e.g., grating lobe interference) for communication between wireless device 806 and the cell of access node 808.

In an embodiment, the interference metric may comprise a PER for wireless device 806. If, after termination of the beamformed signal to wireless device 802, the monitored PER for wireless device 806 does not (meet or) exceed the PER threshold, it may be determined that the beamformed signal to wireless device 802 caused the interference for communication between wireless device 806 and access node 808. For example, it may be determined that the beamformed signal to wireless device 802 from a neighboring cell of access node 808 caused grating lobe interference to the communication between wireless device 806 and the cell of access node 808. Other embodiments where the interference metric comprises one or more of a BLER for wireless device 806 and a number of retransmission attempts from access node 808 to wireless device 806 may similarly be implemented.

At step 1012, the neighboring cell of the access node may be instructed to refrain from transmitting a beamformed signal to the identified wireless device for a period of time. For example, the neighboring cell of access node 808 may be instructed to refrain from transmitting a beamformed signal to wireless device 802 (e.g., identified as an interference source) for a period of time, such as a predetermined period of time.

In other embodiments, the neighboring cell of access node 808 may be instructed to refrain from transmitting a beamformed signal to wireless device 802 for a period of time or until wireless device 802 moves to another location (e.g., a location at least a threshold distance away from the wireless device's location when it was identified as the interference source). Because grating lobe interference is caused by the weights assigned to antennas that transmit a beamformed signal, relocation of a wireless device may alter the circumstances that generate a grating lobe. In some embodiments, the neighboring cell of access node 808 may be instructed to refrain from transmitting a beamformed signal to wireless device 802 for a period of time and/or may be instructed to refrain from transmitting a beamformed signal to other wireless devices within a threshold distance of the location of wireless device 802 when it was identified as the interference source. A location for a wireless device may be determined based on a number of techniques known in the art, such as signal triangulation, a global positioning system, and the like.

In another example, the method of FIG. 10 may progress from step 1008 to step 1014 when it is determined that interference metric for wireless device 806 (e.g., monitored PER after the termination of the beamformed signal to wireless device 802) continues to (meet or) exceed the interference criteria. At step 1014, it may be whether the neighboring cell transmits a beamformed signal to a third wireless device. For example, if, after termination of the beamformed signal to wireless device 802, the monitored interference metric for wireless device 806 continues to (meet or) exceed the interference metric, it may be determined whether the neighboring cell transmits a beamformed signal to a third wireless device. In an example, the neighboring cell of access node 808 may also transmit a beamformed signal to wireless device 804. In addition, because termination of the beamformed signal to wireless device 802 did not cause the monitored interference metric for wireless device 806 to fall below the interference criteria (e.g., threshold), it may be determined that the beamformed signal transmitted to wireless device 802 is not causing the interference between wireless device 806 and the cell of access node 808. Accordingly, wireless device 802 may be added to a cleared list of wireless devices that have been cleared as interference sources.

In an embodiment, the method of FIG. 10 may progress from step 1014 to step 1006 when it is determined that the neighboring cell transmits a beamformed signal to a third wireless device (e.g., wireless device 804). At step 1006, the neighboring cell may similarly be instructed to terminate the transmission of the beamformed signal to wireless device 804. At step 1008, it may then be determined whether the interference metric for wireless device 806 continues to (meet or) exceed the interference criteria after the termination of the beamformed signal to wireless device 804. For example, the monitored interference metric may comprise a PER for wireless device 806, and it may be determined whether the monitored PER for wireless device 806 continues to meet or exceed a PER threshold after the beamformed signal to wireless device 804 has been terminated. Other embodiments for these steps, as described with reference to wireless device 802, may similarly be implemented.

The method of FIG. 10 may progress from step 1008 to step 1010 when it is determined that interference metric for the first wireless device (e.g., monitored PER after the termination of the beamformed signal to wireless device 804) does not continue to (meet or) exceed the interference criteria. Similar to the descriptions herein for steps 1010 and step 1012, wireless device 804 may be identified as the source for interference between the cell of access node 808 and wireless device 806, and the neighboring cell may be instructed to refrain from transmitting a beamformed signal to wireless device 804 for a period of time. Other embodiments for these steps, as described with reference to wireless device 802, may similarly be implemented.

In another example, the method of FIG. 10 may progress from step 1008 to step 1014 when it is determined that interference metric for wireless device 806 (e.g., monitored PER after the termination of the beamformed signal to wireless device 804) continues to (meet or) exceed the interference criteria. In addition, because termination of the beamformed signal to wireless device 804 did not cause the monitored interference metric for wireless device 806 to fall below the interference criteria (e.g., threshold), it may be determined that the beamformed signal transmitted to wireless device 804 is not causing the interference between wireless device 806 and access node 808. Accordingly, wireless device 804 may be added to a cleared list of wireless devices that have been cleared as interference sources.

In an embodiment, the method of FIG. 10 may progress from step 1014 to step 1016 when it is determined that the neighboring cell does not transmit a beamformed signal to a fourth wireless device. For example, wireless devices 802 and 804 may be included on the cleared list of wireless devices. It may be determined whether the neighboring cell transmits a beamformed signal to any wireless devices not included on the cleared list. In an embodiment, the method of FIG. 10 may progress from step 1014 to step 1016 when it is determined that the neighboring cell does not transmit a beamformed signal to any wireless devices no included on the cleared list.

At step 1016, other sources of interference may be searched. For example, a second neighboring cell may be identified in which one or more beamformed signals are transmitted as a potential interference source. In an embodiment, the second neighboring cell may be a neighboring cell of access node 808 (and of the previously identified neighboring cell). Similar to the descriptions for the previously identified neighboring cell and wireless devices 802 and 804, the wireless devices that receive a beamformed signal from the second neighboring cell may be cycled through to determine if one of the wireless devices is causing interference for communication between wireless device 806 and the cell of access node 808.

For example, the second neighboring cell may be instructed to terminate transmission of a beamformed signal to at least a fifth wireless device that receives a beamformed signal from the second neighboring cell. It may be determined whether the interference metric for wireless device 806 continues to (meet or) exceed the interference criteria after termination of the beamformed signal to the fifth wireless device. The fifth wireless device may be identified as an interference source when the interference metric for wireless device 806 does not continue to (meet or) exceed the interference criteria after termination of the beamformed signal to the fifth wireless device. Similar to the descriptions herein, the second neighboring cell may be instructed to refrain from transmitting a beamformed signal to the fifth wireless device for a period of time when the fifth wireless device is identified as an interference source. Various other embodiments as described with reference to steps 1012 may also be implemented.

Figure 11:
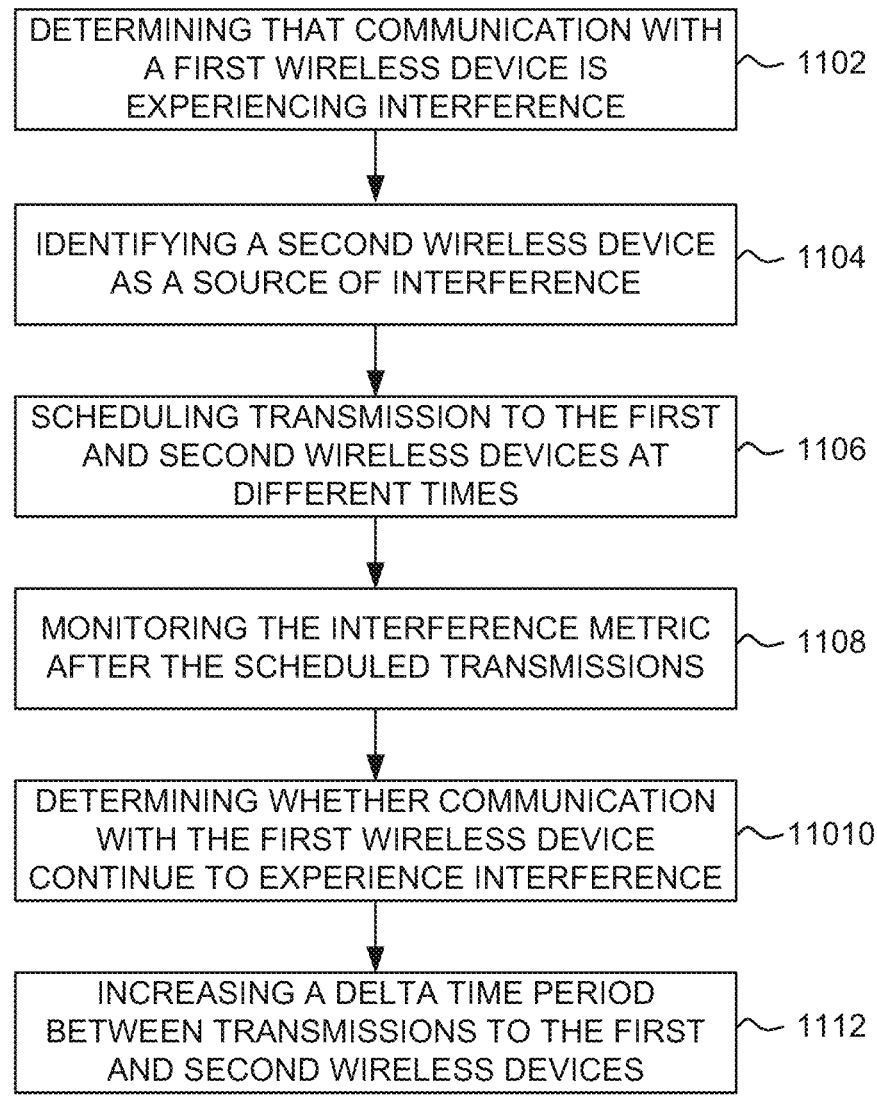
FIG. 11 illustrates another exemplary method of mitigating interference at an access node.

FIG. 11 illustrates another exemplary method for mitigating interference at an access node according to an embodiment. The method will be discussed with reference to the exemplary communication system 800 illustrated in FIG. 8, however, the method can be implemented with any suitable communication system.

Referring to FIG. 11, at step 1102, it may be determined, based on an interference metric for a first wireless device exceeding an interference criteria, that communication between the first wireless device and a cell of an access node is experiencing interference from a neighboring cell. For example, wireless device 806 may be in communication with a cell of access node 808. An interference metric for wireless device 806 may be monitored and compared to an interference metric. In an embodiment, after the comparison it may be determined that the monitored interference metric (meets or) exceeds the interference criteria. Based on the comparison, it may be determined that communication between wireless device 806 and the cell of access node 808 is experiencing interference from a neighboring cell (e.g., a neighboring cell of access node 808). For example, the interference may comprise grating lobe interference.

In an embodiment, the interference metric for wireless device 806 may comprise a packet error rate (PER). For example, the PER for wireless device 806 may be monitored while the wireless device is in communication with the cell of access node 808. It may then be determined that the monitored packet error rate (meets or) exceeds an interference criteria, where the interference criteria may comprise a PER threshold. The PER threshold may be based on an expected PER when grating lobe interference is not experienced, and may be theoretically derived or may be based on historical data. In an embodiment, based on the monitored packet error rate exceeding the packet error rate threshold, it may be determined that communication between wireless device 806 and the cell of access node 808 is experiencing grating lobe interference from a beamformed signal transmitted by a neighboring cell (e.g., neighboring cell of access node 808). Various other detection techniques for detecting that communication is experiencing grating lobe interference may also be implemented, as described herein. For instance, one or more of a BLER for wireless device 806 and a number of retransmission attempts from access node 808 to wireless device 806 may be monitored and compared to an interference criteria.

At step 1104, a second wireless device receiving a beamformed transmission may be identified, wherein the beamformed transmission to the second wireless device is identified as an interference source for communication between the first wireless device and the cell of the access node. For example, wireless device 802 may be identified as an interference source because the wireless device is receiving a beamformed transmission (e.g., from a cell of access node 808). In an embodiment, a wireless device that receives a beamformed signal based on a transmission from a neighboring cell of access node 808 may be identified as an interference source as further described with reference to FIG. 10. For example, the beamformed signal to wireless device 802 from access node 808 may be terminated, and it may be determined that the interference experienced by wireless device 806 and access node 808 changes based on the terminated beamformed signal to wireless device 802. Various other techniques for identifying wireless device 802 as an interference source for communication between wireless device 806 and a cell of access node 808 may be implemented.

At step 1106, transmissions to the first wireless device and the second wireless device may be scheduled such that the scheduled timings for transmissions to the first wireless device are different from the scheduling timings for transmissions to the second wireless device. For example, transmissions to wireless device 802 and wireless device 806 from access node 808 may be scheduled such that the scheduled timings for transmissions to wireless device 802 are different from the scheduling timings for transmissions to wireless device 806. For example, the scheduled timings may differ by one or more transmission time intervals (TTIs).

In an embodiment, a cell of access node 808 may communicate with wireless device 806 while a neighboring cell of access node 808 may communicate with wireless device 802. In some configurations, each cell of access node 808 will comprise a separate scheduler. For this example, the scheduler for the cell communicating with wireless device 806 may communicate with the scheduler for the neighboring cell communicating with wireless device 802 in order to accomplish the different scheduled timings for the two wireless devices. In other examples, a single scheduler may be used for multiple cells of access node 808.

In an embodiment, the difference in scheduled timings may be based on a scheduling algorithm. For example, the schedulers for the cells of access node 808 may communicate such that wireless devices 802 and 806 are scheduled transmissions according to a round robin algorithm (e.g., one after the other).

In another embodiment, the schedulers may implement a delta time between the scheduled transmission times for wireless device 802 and wireless device 806. For example, a first of wireless devices 802 and 806 may be scheduled a transmission time of $T_1$. Here, the scheduler for the second of wireless devices 802 and 806 may schedule a transmission to the second wireless at a time that is at least a delta time $\Delta T$ different from $T_1$. The delta time $\Delta T$ may comprise a predetermined period of time or a random period of time. In an embodiment, $\Delta T$ may comprise a predetermined or random variable (e.g., integer) multiplied by the duration for a TTI of system 800. A TTI comprises a unit of time over which an uplink or downlink transmission may be scheduled (e.g., for an access node or a wireless device). Here, the TTI may be uniform for the multiple cells of access node 808. The variable may be predetermined based on historical data or may be theoretically derived.

At step 1108, the interference metric for the first wireless device may continue to be monitored after the scheduled transmissions at different times. For example, the interference metric for wireless device 806 may continue to be monitored after transmissions are sent to wireless devices 802 and 806 from access node 808 in accordance with the different scheduled timings for the wireless devices. In some embodiments, the different scheduled timings for transmission to wireless devices 802 and 806 will impact the interference experienced for communication between wireless device 806 and the cell of access node 808 at least because wireless device 802 was identified as an interference source for this communication.

At step 1110, it may be determined whether the monitored interference metric for the first wireless device continues to exceed the interference criteria. For example, the monitored interference metric for wireless device 806 after the scheduled transmissions at different times may be compared to the interference criteria. In an embodiment, the interference metric for wireless device 806 may comprise a packet error rate (PER) and the interference criteria may be a PER threshold. Other examples of the interference metric and interference criteria may be implemented consistent with this disclosure. For instance, one or more of a BLER for wireless device 806 and a number of retransmission attempts from access node 808 to wireless device 806 may be monitored and compared to an interference criteria.

At step 1112, a delta time period for scheduled timings for transmissions to the first and second wireless devices may be increased when it is determined that the monitored interference metric for the first wireless device continues to exceed the interference criteria. For example, a delta time period between scheduled timings for transmissions to wireless devices 802 and 806 may be increased when it is determined that the monitored interference metric for wireless device 806 continues to exceed the interference criteria. The determination that the monitored interference metric for wireless device 806 continues to exceed the interference criteria may indicate that communication between wireless device 806 and the cell of access node 808 continues to suffer from grating lobe interference.

As described herein, the delta time period may comprise a predetermined or random variable (e.g., integer) multiplied by the duration for a TTI of system 800. To increase the delta time period, the variable may be increased (e.g., the integer value may be incremented) or the delta time period may be multiplied by a weight (e.g., 1.25, 1.5, 1.75, 2, and the like).

In an embodiment, based on the increased delta time period, communication between wireless device 806 and access node 808 should experience less interference. For example, a first of wireless devices 802 and 806 may be scheduled a transmission time of $T_1$. Here, the scheduler for the second of wireless devices 802 and 806 may schedule a transmission to the second wireless at a time that is at least a delta time $\Delta T$ different from $T_1$, where the delta time has been increased based on an incremented variable, multiplied weight, or any other suitable increase. In an embodiment, the larger delta time between scheduled transmissions for wireless device 802 and wireless device 806 will further reduce interference for communication between wireless device 806 and the cell of access node 808 caused by signals transmitted to wireless device 802.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 12:
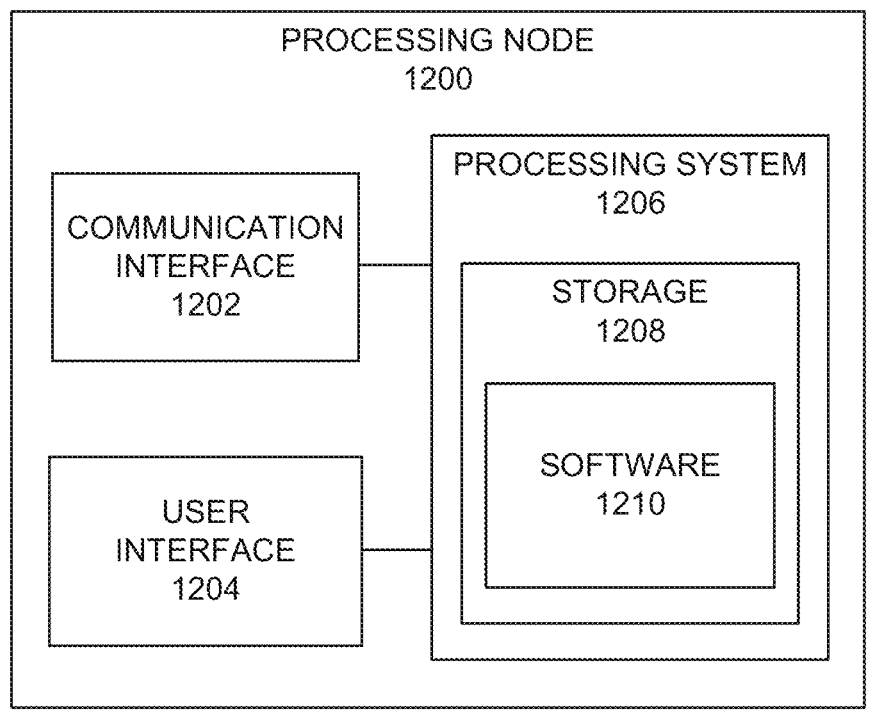
FIG. 12 illustrates an exemplary processing node.

FIG. 12 illustrates an exemplary processing node 1200 in a communication system. Processing node 1200 comprises communication interface 1202, user interface 1204, and processing system 1206 in communication with communication interface 1202 and user interface 1204. Processing node 1200 can be configured to determine a communication access node for a wireless device. Processing system 1206 includes storage 1208, which can comprise a disk drive, flash drive, memory circuitry, or other memory device. Storage 1208 can store software 1210 which is used in the operation of the processing node 1200. Storage 1208 may include a disk drive, flash drive, data storage circuitry, or some other memory apparatus. Software 1210 may include computer programs, firmware, or some other form of machine-readable instructions, including an operating system, utilities, drivers, network interfaces, applications, or some other type of software. Processing system 1206 may include a microprocessor and other circuitry to retrieve and execute software 1210 from storage 1208. Processing node 1200 may further include other components such as a power management unit, a control interface unit, etc., which are omitted for clarity. Communication interface 1202 permits processing node 1200 to communicate with other network elements. User interface 1204 permits the configuration and control of the operation of processing node 1200.

Examples of processing node 1200 include controller node 708 and gateway node 710. Processing node 1200 can also be an adjunct or component of a network element, such as an element of access nodes 106 or 706 and the like. Processing node 1200 can also be another network element in a communication system. Further, the functionality of processing node 1200 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art will also appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for mitigating interference at an access node, the method comprising:
   determining, based on an interference metric for a first wireless device exceeding an interference criteria, that communication between the first wireless device and a cell of an access node is experiencing interference from a neighboring cell;
   identifying at least one neighboring cell in which one or more beam formed signals are transmitted as a potential interference source;
   instructing the identified neighboring cell to terminate transmission of a beamformed signal to at least a second wireless device that receives a beamformed signal from the neighboring cell;
   determining whether the interference metric for the first wireless device continues to exceed the interference criteria after termination of the beamformed signal; and
   identifying the second wireless device as an interference source when the interference metric for the first wireless device does not continue to exceed the interference criteria.

2. The method of claim 1, further comprising:
   instructing the identified neighboring cell to refrain from transmitting a beamformed signal to the identified wireless device for at least a predetermined period of time.

3. The method of claim 1, further comprising:
   determining, when the interference metric for the first wireless device continues to exceed the interference criteria, whether the neighboring cell transmits a beamformed signal to a third wireless device; and
   instructing the identified neighboring cell to terminate transmission of the beamformed signal to the third wireless device when it is determined that the neighboring cell transmits the beamformed signal to the third wireless device;
   determining whether the interference metric for the first wireless device continues to exceed the interference criteria after the termination of the beamformed signal to the third wireless device; and
   identifying the third wireless device as an interference source when the interference metric for the first wireless device does not continue to exceed the interference criteria after the termination of the beamformed signal to the third wireless device.

4. The method of claim 3, wherein the neighboring cell is instructed to enable transmission of the beamformed signal to the second wireless device in addition to being instructed to terminate transmission of the beamformed signal to the third wireless device.

5. The method of claim 4, wherein the second wireless device is added to a list of cleared wireless devices when the interference metric for the first wireless device continues to exceed the interference criteria after the termination of the beamformed signal to the second wireless device.

6. The method of claim 5, further comprising:
adding the third wireless device to a list of cleared wireless devices when the interference metric for the first wireless device continues to exceed the interference criteria after the termination of the beamformed signal to the third wireless device;
determining, when the interference metric for the first wireless device continues to exceed the interference criteria after the termination of the beamformed signal to the third wireless device, whether the neighboring cell transmits a beamformed signal to a fourth wireless device, wherein the cleared list does not include the fourth wireless device.

7. The method of claim 6, further comprising:
identifying a second neighboring cell in which one or more beam formed signals are transmitted as a potential interference source when the neighboring cell does not transmit a beamformed signal to a fourth wireless device that is not included in the cleared list;
instructing the identified second neighboring cell to terminate transmission of a beamformed signal to at least a fifth wireless device that receives a beamformed signal from the second neighboring cell;
determining whether the interference metric for the first wireless device continues to exceed the interference criteria after termination of the beamformed signal to the fifth wireless device; and
identifying the fifth wireless device as an interference source when the interference metric for the first wireless device does not continue to exceed the interference criteria after termination of the beamformed signal to the fifth wireless device.

8. The method of claim 7, further comprising:
instructing the identified second neighboring cell to refrain from transmitting a beamformed signal to the identified wireless device for at least a predetermined period of time.

9. The method of claim 1, wherein determining, based on the interference metric for the first wireless device, that communication between the first wireless device and the cell of the access node is experiencing interference from the neighboring cell further comprises:
monitoring the interference metric for the first wireless device, wherein the interference metric comprises a packet error rate;
determining that the monitored packet error rate exceeds the interference criteria, wherein the interference criteria comprises a packet error rate threshold;
determining, based on the monitored packet error rate exceeding the packet error rate threshold, that communication between the first wireless device and the cell of the access node is experiencing grating lobe interference from a beamformed signal transmitted by a neighboring cell.

10. The method of claim 1, wherein the interference metric comprises at least a block error rate for the first wireless device.

11. A system for mitigating interference at an access node, the system comprising:
a processing node with a processor configured to:
determine, based on an interference metric for a first wireless device exceeding an interference criteria, that communication between the first wireless device and a cell of an access node is experiencing interference from a neighboring cell;
identify at least one neighboring cell in which one or more beam formed signals are transmitted as a potential interference source;
instruct the identified neighboring cell to terminate transmission of a beamformed signal to at least a second wireless device that receives a beamformed signal from the neighboring cell;
determine whether the interference metric for the first wireless device continues to exceed the interference criteria after termination of the beamformed signal; and
identify the second wireless device as an interference source when the interference metric for the first wireless device does not continue to exceed the interference criteria.

12. The system of claim 11, wherein the processing node is further configured to:
instruct the identified neighboring cell to refrain from transmitting a beamformed signal to the identified wireless device for at least a predetermined period of time.

13. The system of claim 11, wherein the processing node is further configured to:
determine, when the interference metric for the first wireless device continues to exceed the interference criteria, whether the neighboring cell transmits a beamformed signal to a third wireless device; and
instruct the identified neighboring cell to terminate transmission of the beamformed signal to the third wireless device when it is determined that the neighboring cell transmits the beamformed signal to the third wireless device;
determine whether the interference metric for the first wireless device continues to exceed the interference criteria after the termination of the beamformed signal to the third wireless device; and
identify the third wireless device as an interference source when the interference metric for the first wireless device does not continue to exceed the interference criteria after the termination of the beamformed signal to the third wireless device.

14. The system of claim 13, wherein the neighboring cell is instructed to enable transmission of the beamformed signal to the second wireless device in addition to being instructed to terminate transmission of the beamformed signal to the third wireless device.

15. The system of claim 14, wherein the second wireless device is added to a list of cleared wireless devices when the interference metric for the first wireless device continues to exceed the interference criteria after the termination of the beamformed signal to the second wireless device.

16. The system of claim 15, wherein the processing node is further configured to:
add the third wireless device to a list of cleared wireless devices when the interference metric for the first wireless device continues to exceed the interference criteria after the termination of the beamformed signal to the third wireless device;
determine, when the interference metric for the first wireless device continues to exceed the interference criteria after the termination of the beamformed signal to the third wireless device, whether the neighboring cell transmits a beamformed signal to a fourth wireless device, wherein the cleared list does not include the fourth wireless device.

17. The system of claim 16, wherein the processing node is further configured to:

identify a second neighboring cell in which one or more beam formed signals are transmitted as a potential interference source when the neighboring cell does not transmit a beamformed signal to a fourth wireless device that is not included in the cleared list;

instruct the identified second neighboring cell to terminate transmission of a beamformed signal to at least a fifth wireless device that receives a beamformed signal from the second neighboring cell;

determine whether the interference metric for the first wireless device continues to exceed the interference criteria after termination of the beamformed signal to the fifth wireless device; and identify the fifth wireless device as an interference source when the interference metric for the first wireless device does not continue to exceed the interference criteria after termination of the beamformed signal to the fifth wireless device.

18. The system of claim 17, wherein the processing node is further configured to:

instruct the identified second neighboring cell to refrain from transmitting a beamformed signal to the identified wireless device for at least a predetermined period of time.

19. The system of claim 11, wherein determining, based on the interference metric for the first wireless device, that communication between the first wireless device and the cell of the access node is experiencing interference from the neighboring cell further comprises:

monitoring the interference metric for the first wireless device, wherein the interference metric comprises a packet error rate;

determining that the monitored packet error rate exceeds the interference criteria, wherein the interference criteria comprises a packet error rate threshold;

determining, based on the monitored packet error rate exceeding the packet error rate threshold, that communication between the first wireless device and the cell of the access node is experiencing grating lobe interference from a beamformed signal transmitted by a neighboring cell.

20. The system of claim 11, wherein the interference metric comprises at least a block error rate for the first wireless device.

* * * * *